United States Patent Office 3,563,882
Patented Feb. 16, 1971

3,563,882
SYSTEM AND METHOD FOR LAYING ELECTRIC CABLES BETWEEN A NUMBER OF ELECTRIC EQUIPMENTS
Ryoichi Kimura, Yokohama, Kiyomi Omatsuzawa, Kamakura-shi, Yasuyuki Tanaka and Hiroshi Yoshikawa, Yokohama, Japan, assignors to Hitachi, Ltd., Tokyo, Japan, a corporation of Japan
Filed Mar. 18, 1968, Ser. No. 713,851
Claims priority, application Japan, Mar. 20, 1967, 42/17,096
Int. Cl. F16l 3/00
U.S. Cl. 248—49              1 Claim

ABSTRACT OF THE DISCLOSURE

A system for laying electric cables between a number of pieces of electric equipment constituting a large electrical installation, which utilizes a number of cable racks having a unit area secured to beams which are provided over said pieces of electric equipment to support said equipment, advantages of said system being that said cable racks can be pre-fabricated in workshops and that said cables can be laid by approximately straight route, thereby bringing about considerable savings in time, labor and material; and a method for laying cables using such a system.

This invention relates to a system and method for laying electric cables between separate pieces of equipment in a large electrical installation such as a telephone exchange and a power generating or distributing facility.

Hitherto, electric cables which connect respective component equipment in a large electrical installation, have been laid on ladder-shaped cable racks which are secured to support members suspended from the ceiling of room and which are disposed over the equipment in parallel and cross-wise. Such cable racks will assume various formations depending on the shape of the room, the general arrangement of the equipment in the room, the amount of the cables to be supported and other factors. Therefore, fabrication of such cable racks has been carried out on the site of construction of the installation, each component member being made in such shape as to fit to the specific requirements of the spot, though an approximate design of the racks has been made prior to the construction. Accordingly, such work has generally required many man-hours. Moreover, laying of cables on such racks and connection of the cables to the respective pieces of equipment also have taken many man-hours, as the required length of each cable must be deetermined on the spot, the length being measured along the squarely crossing racks. Further, a considerable quantity of cable would have been wasted by laying the cables along such detours, this being the greatest disadvantage in the conventional systems.

The primary object of this invention is to provide a system for laying electric cables between component electric equipment belonging to an electrical installation, which enables the construction work of the cable supporting structures and the work for connecting the cables to the respective pieces of equipment to be completed in a remarkably short period.

Another object of this invention is to provide a method for laying electric cables between component equipment belonging to an electrical installation, which enables the cables to be laid substantially in straight lines connecting two pieces of equipment, thus saving considerable length of cable from being wasted.

In order to attain the above-mentioned objects, the system for laying electric cables between pieces of electric equipment according to this invention makes use of the frame supporting beams which are horizontally held near the ceiling of the room to support a number of frames accommodating said electric equipment (hereafter, referred to as equipment frames) and standing on the floor of the room. A virtual horizontal plane is constituted over said equipment frames by a number of cable racks which can be very easily mounted to the abovedescribed frame supporting beams. The electric cables are laid on the thus constituted plane, connecting two pieces of electric equipment by way of an almost straight route.

For a clear understanding of this invention, this invention will be described hereunder with reference to the attached drawings which show an embodiment of this invention and in which.

Figure 1:
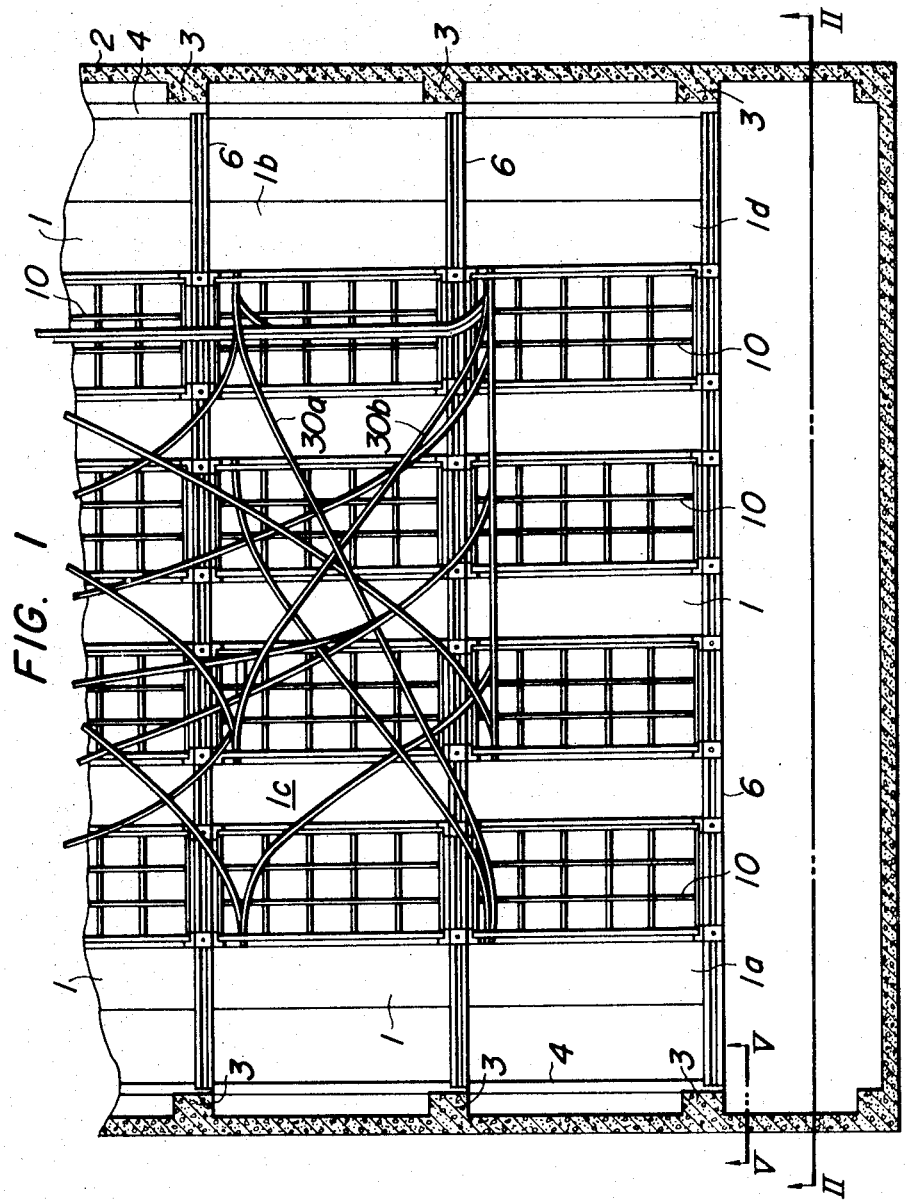
FIG. 1 is a plan view of a portion of a typical electrical installation involving the system of this invention, when viewed with the ceiling of the room removed.
Figure 2:
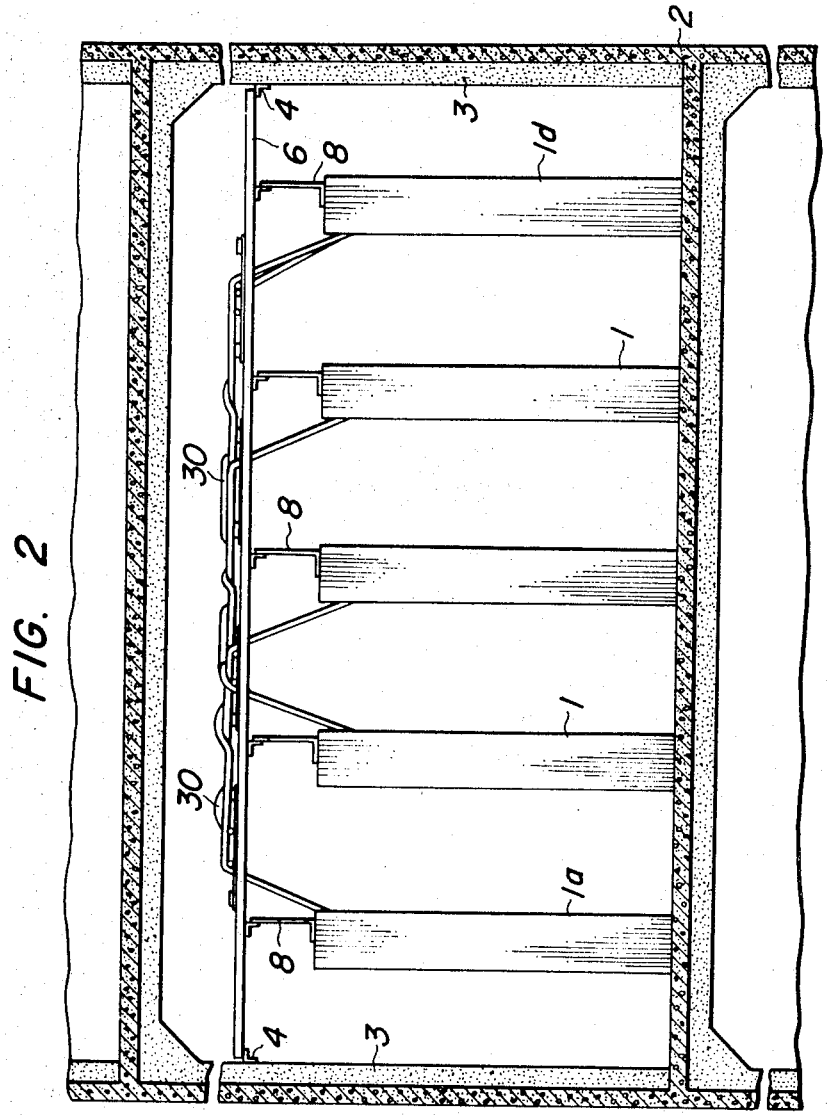
FIG. 2 is a side view of the same installation, at a spot indicated by the arrows II—II shown in FIG. 1.
Figure 5:
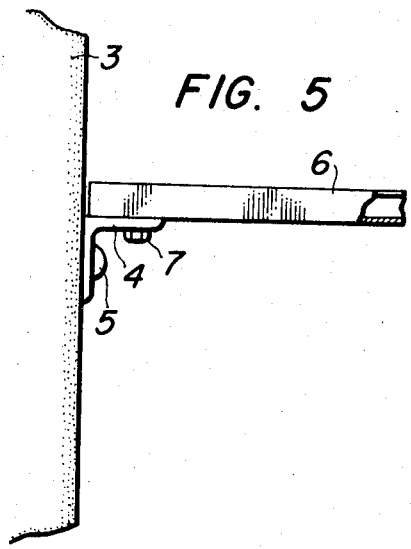
FIG. 5 shows detail of securing of the frame supporting beam to a pillar of the room, at a spot indicated by the arrows V—V in FIG. 1.

Now, referring to FIGS. 1, 2 and 5, each of a pair of angle bars 4 is secured with rivets 5 to the pillars 3 on each side of the room 2 which accommodates a number of equipment frames 1. Onto these angle bars are secured with bolts 7 a number of the frame supporting beams 6 comprising C-shaped channel bar, said beams 6 being spaced from each other by substantially the same distance as the width of the equipment frames 1. A number of equipment frames 1 standing on the floor of the room 2 are connected with support members 8 to the frame supporting beams 6 to be kept upright. Each of said frames is appropriately spaced from the adjacent frames to allow sufficient passage between them for inspection.

Figure 3:
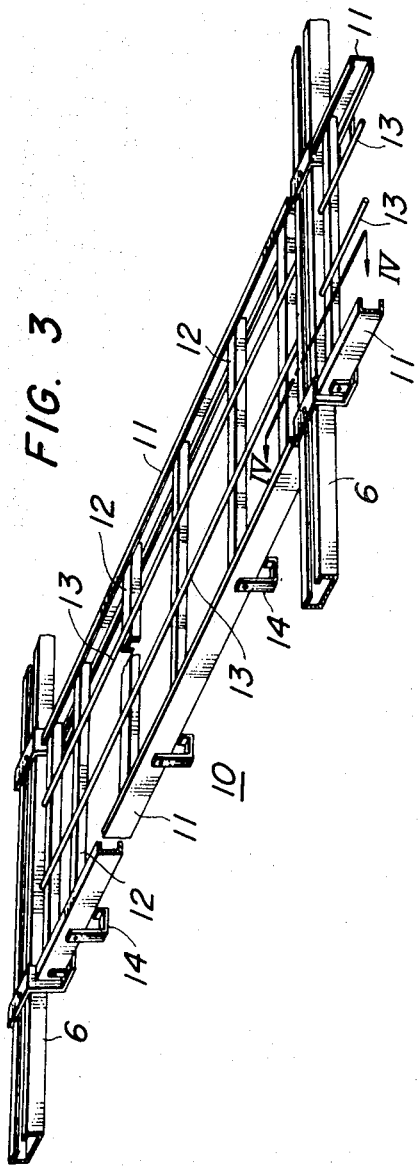
FIG. 3 is an isometric view of the cable racks which constitute a virtual plane for carrying the electric cables over the equipment frames and also showing a part of the frame supporting beams to which the cable racks are secured.

The cable rack 10 as shown in FIG. 3 is constructed from two channel members 11 positioned in parallel, a plurality of reinforcement members 12 welded to said channel members, connecting two of them laterally, and a plurality of rod members 13 welded to said reinforcement members in parallel to said channel members.

As will be seen from FIG. 1, such a cable rack 10 of unit area size has a length substantially equal to the distance between two adjacent beams 6 and a width substantially equal to the distance between two adjacent equipment frames 1. Therefore, such racks of the standard dimensions can be prefabricated in quantities. Referring to FIG. 3, L-shaped racks 14 suspended from the channel member 11 are used for supporting auxiliary cables which are not shown in the figure. Such auxiliary racks may either be attached to the member 11 before construction of the whole rack 10, or be secured to the member 11 with bolts and nuts when necessary.

Figure 4:
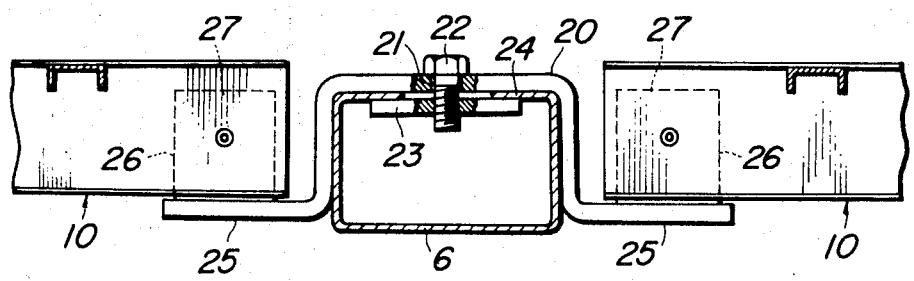
FIG. 4 is a partly sectioned side view at a spot indicated by the arrows IV—IV in FIG. 3 and shows detail of securing of the cable racks to the frame supporting beam.

FIG. 4 shows an embodiment of structure for securing the cable racks 10 to the frame supporting beam 6. As shown in the figure, hat-shaped support member 20 is fixed, after its position along the length of the beam has been adjusted, at the required position by screwing bolt 22, through the hole 21, into the threaded hole of tightening piece 23 which is engaged to fringes 24 of the frame supporting beam 6. On each fringe portion 25 of the hat-shaped support member 20 is welded an L-shaped fixing piece 26, and to upright side 27 of the fixing piece 26 is secured the end portion of the channel member 11 of the cable rack 10 with bolt and nuts or rivets or other similar means.

According to the above-described structure, a number of cable racks 10, each having a unit area, are disposed over the corresponding number of spaces between the equipment frames 1, being secured to the frame supporting beams 6 through the fixing pieces 20 at four corner portions thereof, and thereby constituting a virtual plane over the whole of the equipment frames 1. As shown in FIG. 1, a number of electric cables 30 connecting the equipment frames 1 are laid on the above-mentioned plane by substantially straight routes and without any significant rise or fall as seen by cables 30a or 30b connecting equipment frames 1a and 1b or frames 1c and 1d in the figure.

It will be obvious that if the width of the equipment frame and the distance between two adjacent equipment frames are given, the dimensions of a unit cable rack 10 can be readily determined. Accordingly, such unit cable racks can be manufactured in quantities and at lower cost in experienced manufacturers' factories. Moreover, by mounting such unit cable racks 10 onto the frame supporting beams 6, a system for laying electric cables 30 between the equipment frames 1 can be constructed in a very short period. Further, the fact that a virtual plane is constituted by the cable racks, enables the cables 30 to be laid by substantially straight routes and without any significant rise or fall, thereby the required length of the cables being reasonably reduced. Still further, as the required length of each cable can be safely estimated prior to actual laying because of its almost straight route, cutting of the cables and preparation of their end portions for connection can be carried out in a workshop prior to laying of the cables, thereby reducing the time required for laying and connecting the electric cables on the site of construction.

In the above-described embodiment, a unit cable rack is provided over the space between every two adjacent equipment frames. However, it will be well understood that other arrangements of the cable racks also are effective. For example, some of the unit cable racks can be omitted in places where no cable is to be laid, or the unit cable racks can be provided not only over the spaces between two adjacent equipment frames, but also over the equipment frames per se.

This invention has been described hereinbefore mainly in the way of an embodiment referring to the attached drawings. However, it will be understood that the embodiment has been shown so that those skilled in the art can fully comprehend this invention for the actual application of this invention, and that this invention is not limited to the above embodiment, various modifications, to fit respective applications, being possible in the scope of what we claim.

What we claim is:

1. A system for supporting electric cables extending selectively between a plurality of equipment frames supported at their upper ends by a plurality of horizontally disposed frame supporting beams positioned in substantially parallel spaced relationship above said equipment frames, said system comprising a plurality of cable racks which are constructed of two parallel disposed channel members, a plurality of reinforcement members connected at right angles with said channel members and a plurality of rod members disposed parallel with said channel members and connected with said reinforcement members, secured to said frame supporting beams to form a horizontally unrestricted virtual plane above said equipment frames upon which said cables may be supported for disposition in any direction in the horizontal plane.

References Cited

UNITED STATES PATENTS

| | | | |
|---|---|---|---|
| 2,434,918 | 1/1948 | Gall | 174—72 |
| 2,467,828 | 4/1949 | Hodgkins | 317—122 |
| 2,688,109 | 8/1954 | Holland | 317—122 |
| 2,756,369 | 7/1956 | Gorrie | 317—122 |
| 3,351,699 | 11/1967 | Merckle | 248—68X |

FOREIGN PATENTS

| | | | |
|---|---|---|---|
| 1,322,281 | 2/1963 | France | 248—49 |

CHANCELLOR E. HARRIS, Primary Examiner

U.S. Cl. X.R.

174—72; 317—122